US012779299B2

(12) United States Patent
Cliffe

(10) Patent No.: US 12,779,299 B2
(45) Date of Patent: Nov. 3, 2026

(54) GOLF CLUB CLEANER

(71) Applicant: Robert Arthur Cliffe, Calgary (CA)

(72) Inventor: Robert Arthur Cliffe, Calgary (CA)

(73) Assignee: Robert Arthur Cliffe

( * ) Notice: Subject to any disclaimer, the term of this patent is extended or adjusted under 35 U.S.C. 154(b) by 443 days.

(21) Appl. No.: 18/502,258

(22) Filed: Nov. 6, 2023

(65) Prior Publication Data

US 2025/0144487 A1 May 8, 2025

(51) Int. Cl.

*A63B 57/60* (2015.01)
*A63B 60/62* (2015.01)
*B08B 1/20* (2024.01)
*B08B 3/04* (2006.01)

(52) U.S. Cl.

CPC ................ *A63B 57/60* (2015.10); *B08B 3/04* (2013.01); *A46B 2200/3073* (2013.01); *A63B 60/62* (2015.10); *B08B 1/20* (2024.01); *B65D 2543/00435* (2013.01)

(58) Field of Classification Search

CPC . A63B 57/60; A63B 47/04; A46B 2200/3073; B08B 1/12
USPC ..................................... 15/88.1, 160, 104.92
See application file for complete search history.

(56) References Cited

U.S. PATENT DOCUMENTS 597,729 A * 1/1898 Mitchell ................ A63B 57/60 15/104.92
2,629,124 A * 2/1953 Merritt ................. A45D 29/007 132/73
3,304,659 A * 2/1967 Eichhorn ............... A63B 47/04 15/21.2
3,316,922 A * 5/1967 Seidler ................. A45D 29/007 401/122
4,651,892 A * 3/1987 Boersma ............ B21D 51/2615 220/320
4,872,235 A * 10/1989 Nielsen ..................... B08B 1/12 15/104.92
4,965,906 A * 10/1990 Mauro .................. A63B 57/60 15/21.2
5,404,610 A 4/1995 Coyer et al.
(Continued)

FOREIGN PATENT DOCUMENTS

NL 1036395 C2 7/2010

*Primary Examiner* — Courtney D Heinle
*Assistant Examiner* — Wesley Le Fisher
(74) *Attorney, Agent, or Firm* — Daniel Enea; Jordan Sworen; Argus Intellectual Enterprises, LLC

(57) ABSTRACT

A golf club cleaner is provided. The golf club cleaner is a portable device to be carried by a golfer or easily attached to a golf bag that cleans and maintains the pristine condition of golf club heads ensuring optimal performance on the golf course. The golf club cleaner includes a housing with an interior compartment that securely holds cleaning fluid, readily accessible through an open upper end. A brush assembly that fits over the housing's open end, features an open channel design with a shoulder and an array of bristles. These bristles effectively remove debris when the golf club head is agitated against them. A sleeve having an annular ring member securely engages with the housing and brush assembly, creating an integrated and easily assembled configuration. Furthermore, the golf club cleaner includes a lid, designed to seal the contents of the housing and the brush assembly.

11 Claims, 3 Drawing Sheets

(56) References Cited

U.S. PATENT DOCUMENTS

| | | | | |
|---|---|---|---|---|
| 5,666,684 | A * | 9/1997 | Cussen | A63B 57/60 15/160 |
| 5,732,435 | A | 3/1998 | Williams et al. | |
| 5,947,320 | A * | 9/1999 | Bordner | B65D 47/121 220/803 |
| 6,216,305 | B1 | 4/2001 | Joh | |
| 6,317,916 | B1 | 11/2001 | Smith | |
| 6,430,770 | B1 * | 8/2002 | Glass | A63B 57/60 15/160 |
| 6,745,424 | B1 | 6/2004 | Pimentel et al. | |
| 7,162,766 | B1 * | 1/2007 | Yakopcic | A63B 57/60 15/160 |
| 7,302,915 | B2 * | 12/2007 | Leary | A01K 13/001 119/664 |
| 7,971,308 | B1 * | 7/2011 | Lawson | A46B 13/006 15/21.2 |
| 8,844,588 | B2 | 9/2014 | Low et al. | |
| 2002/0069472 | A1 | 6/2002 | Glass | |
| 2005/0262654 | A1 | 12/2005 | Cotton | |
| 2017/0072271 | A1 | 3/2017 | Betz | |
| 2022/0379183 | A1 | 12/2022 | Taylor | |

* cited by examiner

GOLF CLUB CLEANER

BACKGROUND OF THE INVENTION

The present invention relates to a golf club cleaner. The present invention further provides a golf club cleaner that holds a cleaning solution such that abrading the golf club against brushes thereof cleans the golf club head.

Golf, a sport beloved by millions worldwide, demands precision and skill with every swing to make good contact with the golf ball. One element that contributes to a golfer's success is the condition of their golf clubs, especially the club head. A clean golf club head can significantly impact a golfer's performance, as dirt, debris, and grime accumulated on the club head can adversely affect ball control, accuracy, and distance.

While some golf courses offer dedicated cleaning stations, they are not always readily accessible when needed, leaving golfers searching for alternative solutions to maintain their club heads in optimal condition. Some golfers utilize a towel to rub the face of the club to remove dirt and debris therefrom. There exist some portable golf club head cleaning devices that have attempted to address some of the needs associated with maintaining a clean club head. However, these devices often fall short in various aspects, leaving room for innovation and improvement.

For example, many of these portable club head cleaners have a reservoir for holding a cleaning solution, however they lack an effective spill-resistant design, leading to inconveniences such as leakage of cleaning solution during transportation, thereby making them less than ideal for golfers on the move. Moreover, these reservoirs lack the necessary depth and agitating capabilities required to thoroughly clean club heads. As a result, stubborn residues often remain, impacting a golfer's performance on the course.

The present invention aims to address these deficiencies by providing a comprehensive solution that caters to the needs of golfers seeking a convenient and effective means of keeping their golf club heads clean. The present invention provides a portable cleaner that does not require intricate cleaning processes and frequent replacement of parts, which can be impractical for golfers who seek a simple and efficient solution that won't detract from their time on the course.

Given these considerations, there is a need for device that is easily mounted to a golf bag, ensuring accessibility and convenience for golfers using push/pull carts, power carts, or carrying bags. The device features a deep reservoir with a secure snap-on lid and a flexible clip and hanger system, rendering it exceptionally leak and spill-resistant, even when subjected to the rigors of golfing on various terrains. The material used is non-absorbent, which means it won't become saturated with grime and cleaning solution, and it can be easily drained and air-dried after use, ensuring long-lasting durability and preventing unpleasant odors.

In light of the devices disclosed in the known art, it is submitted that the present invention substantially diverges in design elements and methods from the known art and consequently it is clear that there is a need in the art for an improvement for golf club cleaners. In this regard the instant invention substantially fulfills these needs.

SUMMARY OF THE INVENTION

In view of the foregoing disadvantages inherent in the known types of golf club cleaner now present in the known art, the present invention provides a new golf club cleaner for cleaning a head of the golf club.

It is an objective of the present invention to provide a golf club cleaner for cleaning a head of a golf club. The golf club cleaner includes a housing having an interior compartment configured to hold fluid therein and a lip extending around an open upper end thereof. A brush assembly is configured to seat over the open end of the housing, wherein the brush assembly comprises a sidewall forming an open channel from a first end to an opposing second end. A shoulder is disposed at the first end and sized to seat over the lip of the housing and a plurality of bristles are disposed on an interior side of the sidewall and projecting towards the channel. The plurality of bristles is adapted to engage with the golf club head when inserted within the housing to agitate debris from the head.

It is an objective of the present invention to provide a golf club cleaner having a sleeve that comprises an annular ring member that is adapted to receive the housing therethrough. The upper end of the sleeve member is configured to engage with the lip of the housing and the shoulder of the brush assembly. In an assembled configuration, the sleeve is configured to cooperatively and removably secure the housing and the brush assembly thereto.

It is an objective of the present invention to provide a portable golf club head cleaner with a spill-resistant design that overcomes the common issue of leakage, ensuring that golfers can carry it in their golf bags without the risk of cleaning solution spillage during transportation.

It is another objective of the present invention to provide a golf club head cleaner with a deep and agitating cleaning reservoir to ensure that club heads are thoroughly cleaned, enhancing golfers' performance by maintaining optimal ball control, accuracy, and distance.

It is an objective of the present invention to provide a golf club head cleaner with durable, waterproof materials, addressing the common problems of long-term durability and water resistance. The golf club head cleaner mitigates the inconveniences associated with complicated cleaning processes and clutter in golf bags.

It is an objective of the present invention to provide a golf club cleaner with a sleeve featuring an annular ring member designed to receive and securely engage with the housing and brush assembly, thereby forming an assembled configuration that is both cooperative and removably secure. This feature ensures ease of assembly and disassembly, simplifying maintenance and promoting the longevity of the device.

It is therefore an object of the present invention to provide a new and improved golf club cleaner and method of cleaning said golf club that has all of the advantages of the known art and none of the disadvantages.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
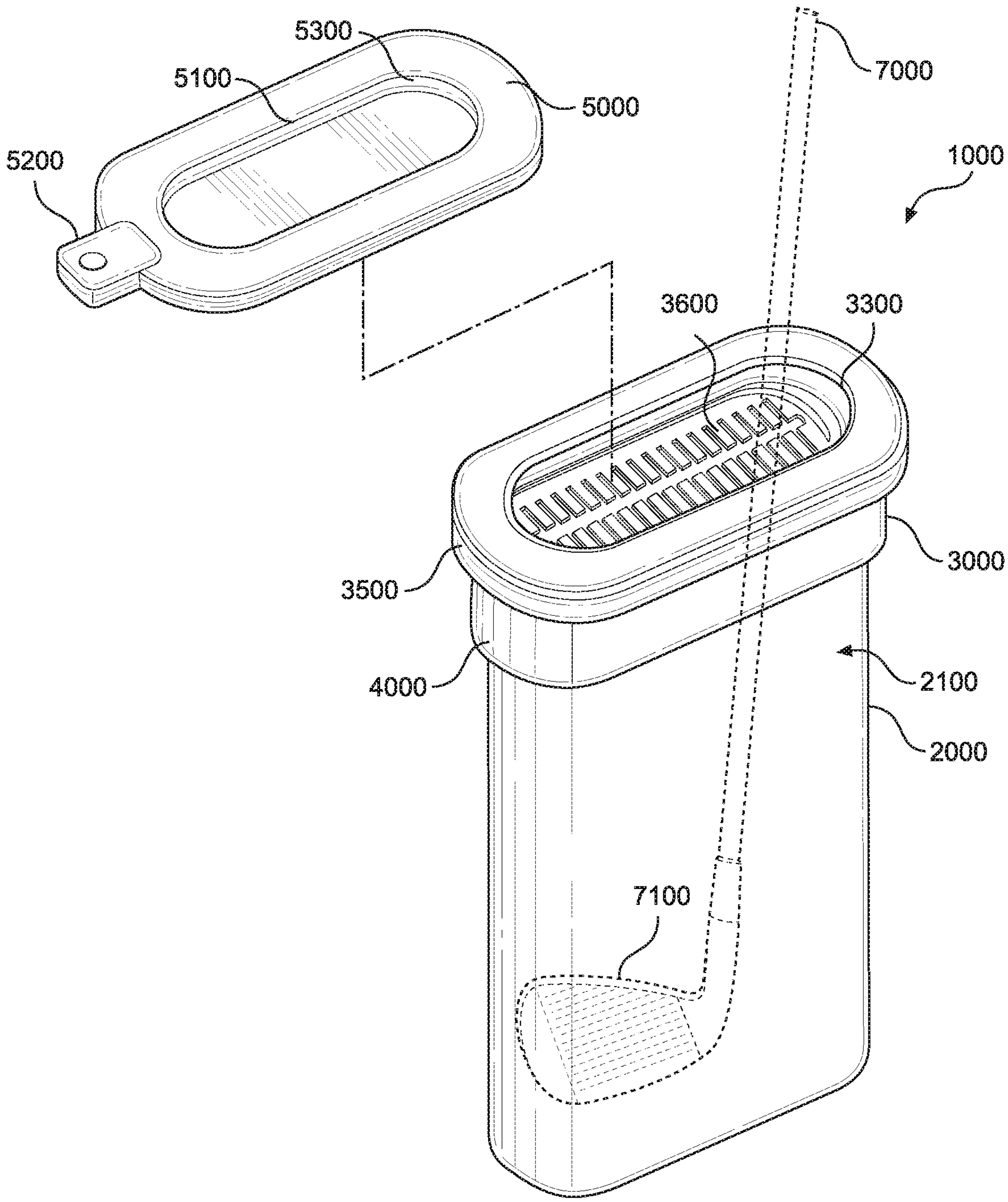
FIG. 1 shows a perspective view of an embodiment of a golf club cleaner with golf club inserted within the housing.

Reference is made herein to the attached drawings. Like reference numerals are used throughout the drawings to depict like or similar elements of the system. For the purpose of presenting a brief and clear description of the present invention, the embodiment discussed will be as a golf club cleaner that receives a golf club head, such as an iron, wherein the agitation of the golf club head against the brush assembly removes debris deposited thereon. The figures are intended for representative purposes only and should not be considered to be limiting in any respect.

Reference will now be made in detail to the exemplary embodiment(s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment" does not necessarily refer to the same embodiment.

Figure 2:
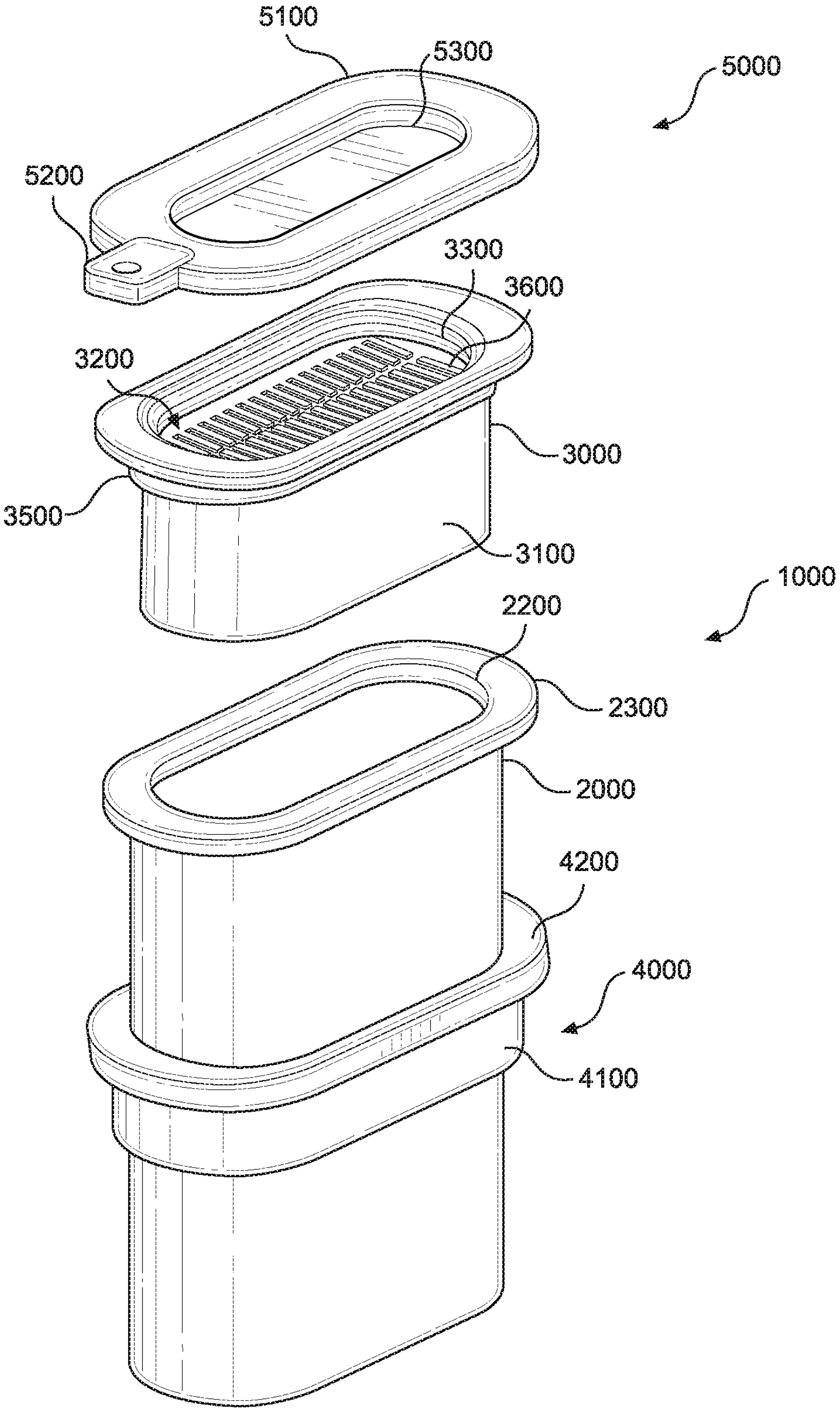
FIG. 2 shows an exploded view of an embodiment of the golf club cleaner.

Referring now to FIGS. 1 and 2, there is shown a perspective view of a golf club cleaner with golf club inserted within the housing and an exploded view of the golf club cleaner, respectively. The golf club cleaner provides a portable device that can be carried by a golfer, or connected to a golf bag or the like, that is sized to receive a head of a golf club within the interior volume such that agitation of the head against the bristles causes debris to be removed from the head. The golf club cleaner 1000 comprises a housing 2000 sized and configured to receive a golf club head 7100 of a golf club 7000 therein. The housing 2000 comprises an interior compartment 2100 configured to hold fluid therein, such as a fluid cleaning solution, wherein the interior compartment 2100 is accessible via an open upper end 2200 of the housing 2000. In the shown embodiment, the housing 2000 comprises an elongated cylinder shape with a sidewall having a pair of rounded sides and a pair of substantially flat sides. In alternative embodiments, the shape and size of the housing 2000 includes a rectangular prism, a trapezoidal prism, and the like.

Figure 3:
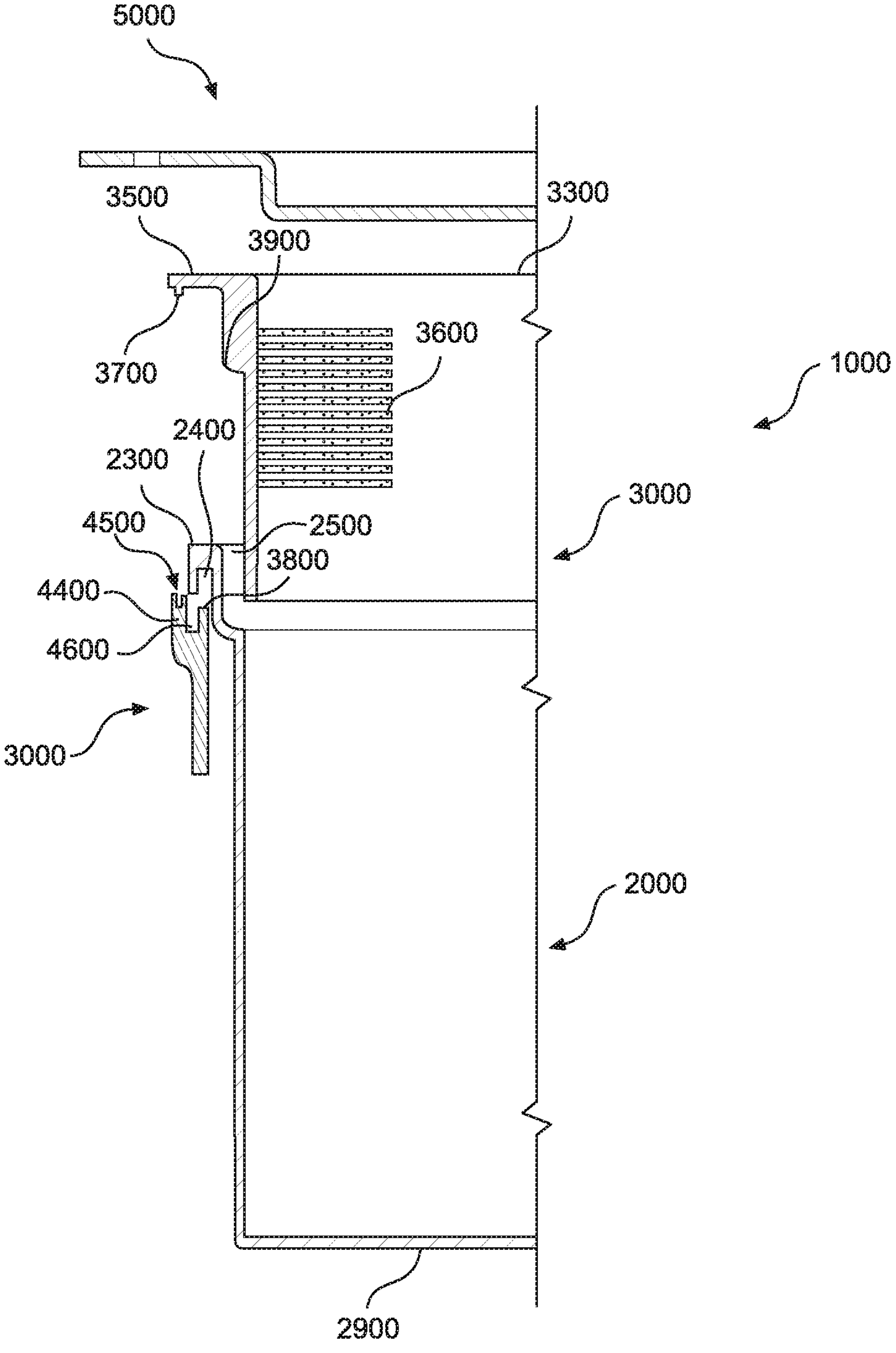
FIG. 3 shows a cross-sectional view of an embodiment of the golf club cleaner.

In the shown embodiment and best shown in FIG. 2, the housing 2000 includes a lip 2300 disposed around the open upper end 2200. The lip 2300 projects radially outward from the open upper end 2200. In some embodiments, the housing 2000 includes a ledge below the lip 2200 for interlocking with a brush assembly 3000. The ledge is best shown in FIG. 3. In some embodiments, the sidewall of the housing 2000 is entirely vertical when viewed from a cross sectional view. In one embodiment, the housing 2000 comprises a single, monolithic structure that is flexible. The housing 2000 forms a waterproof barrier that holds the cleaning solution within the interior volume. The flexibility of the housing 2000 is adapted to allow for folding or otherwise arranging the housing 2000 in a smaller configuration for storage and transport.

In one embodiment, the interior sidewall of the housing comprises a plurality of bumps arranged therealong. The plurality of bumps provides an additional surface to agitate the golf head thereagainst when cleaning the golf club head.

In one embodiment, the plurality of bumps are arranged along a lower half of the housing 2000.

In the shown embodiment, the brush assembly 3000 is configured to seat over the open end of the housing 2000. The brush assembly 3000 comprises a sidewall 3100 forming an open channel 3200 from a first end 3300 to an opposing second end. A shoulder 3500 is disposed at the first end 3300 and is sized to seat over the lip 2300 of the housing 2000. A plurality of bristles 3600 are disposed on an interior side of the sidewall 3100 and project inwards towards the channel 3200. In the shown embodiment, the plurality of bristles 3600 are positioned at a depth from the first end 3300, wherein the plurality of bristles 3600 are adapted to scrub the golf club head when reciprocated thereagainst. In the shown embodiment, the depth and position of the plurality of bristles 3600 are sufficient to retain a cleaning solution within the housing during the cleaning process. In one embodiment, if the plurality of bristles 3600 are positioned immediately adjacent to first end, the fluid stored within the housing 2000 and picked up by the golf club head during the cleaning process is ejected from the housing when the golf club head is agitated against the plurality of bristles 3600. As shown in FIG. 3, the plurality of bristles 3600 are perpendicular to the sidewall 3100 and are positioned annularly therearound. In some embodiments, one or more of the plurality of bristles are disposed at an angle extending upwards or downwards relative to the sidewall. In alternate embodiments, the bristles extending across from one another overlap to provide additional engagement when cleaning a top or bottom surface of the golf club head.

In one embodiment, the golf club cleaner 1000 further comprises a sleeve 4000 having an annular ring 4100 member that is adapted to receive the housing 2000 therethrough. The sleeve 4000 is sized to slide along the sidewall of the housing 2000 so as to position the sleeve towards the open upper end 2200 of the housing 2000 and to be removed from the housing 2000 via a second end. An upper end 4200 of the sleeve member 4000 is configured to engage with the lip 2300 of the housing 2000 and the shoulder 3500 of the brush assembly 3000.

In one embodiment, the sleeve 4000 is configured to cooperatively and removably secure the housing 2000 and the brush assembly 3000 thereto in an assembled configuration. In the assembled configuration, such as shown in FIG. 1, the sleeve 4000 is positioned at the open upper end 2200 of the housing 2000.

In the shown embodiment, the golf club cleaner 1000 further comprises a lid 5000 configured to seal contents of the housing 2000. The lid 5000 comprises a recessed body 5100 sized to fit within the interior compartment 2100 of the housing 2000. A tab 5200 extends from a side of the body 5100, wherein the tab 5200 is configured to overhang the sleeve 4000 in a closed configuration. The tab 5200 is configured to provide a gripping surface to remove the lid 5000 from the brush assembly 3000. In the closed/sealed configuration, the lid 5000 is secured to the brush assembly 3000 in the assembled configuration. The tab 5200 is shown extending past a perimeter of the sleeve 4000 in the closed configuration.

In the shown embodiment, the lid 5000 is sized to engage to the first end and interior of the brush assembly 3000. The body 5100 of the lid 5000 includes a recessed center portion 5300 that extends towards the plurality of bristles 3600 when secured over the brush assembly 3000. The recessed center portion 5300 is configured to frictionally engaged with the brush assembly 3000 to close the first end 3300 of the brush assembly 3000, thereby sealing the contents of the golf club cleaner 1000 therein. In one embodiment, the lid 5000 forms a watertight seal that prevents a fluid from exiting the golf club cleaner 1000.

In one embodiment, the golf club cleaner 1000 is adapted to affix to a golf bag via a clip or other fastener. In some embodiments, the golf club cleaner 1000 is sized to be received within a pocket of the golf bag.

Referring now to FIG. 3, there is shown a cross-sectional view of an embodiment of the golf club cleaner. The golf club cleaner 1000 comprises the housing 2000, the brush assembly 3000, the sleeve 4000, and the lid 5000. The brush assembly 3000 is adapted to nest within the housing 2000, and the housing 2000 is adapted to partially nest within the sleeve 4000 in the assembled configuration. In this assembled configuration, the housing 2000, the brush assembly 3000, and the sleeve 4000 are cooperatively joined together.

In the shown embodiment, the lip 2300 of the housing 2000 comprises a female fastener 2400 configured to engage with a male fastener 3800 of the sleeve 4000 to secure the sleeve 4000 to the housing 2000. The sleeve 4000 comprises a sleeve ledge 4400 having an annular groove 4500 configured to engage a tongue 3700 disposed on an underside of the shoulder 3500 of the bristle assembly 3000. In one embodiment, the annular groove 4500 extends entirely around the sleeve 4000. In one embodiment, the annular groove 4500 corresponds to the tongue 3700, such that both are sized to be joined entirely around the cleaner 1000.

In one embodiment, the sleeve ledge 4400 is positioned distal to the female fastener 2400 and vertically offset therefrom to form a sleeve trench 4600, wherein the sleeve trench 4600 is sized to receive the lip 2300 of the housing 2000 therein, wherein an upper side of the lip 2300 and an upper side of the sleeve ledge 4400 are coplanar when the male fastener 3800 is received within the female fastener 2400. In this way, neither the lip 2300 nor the sleeve ledge 4400 snag clothes, towels, or other objects when moving across the lip 2300.

In one embodiment, the housing 2000 further comprises a housing ledge 2500 vertically offset from the lip 2300 of the housing, wherein the housing ledge 2500 is configured to receive a protrusion 3900 of the brush assembly 3000 therein, wherein the mating of the housing ledge 2500 and protrusion 3900 seats the brush assembly 3000 to the housing 2000. In one embodiment, the housing 2000 further comprises a flat lower end 2900 opposing the upper end, wherein the flat lower end 2900 is configured to remain upright on a horizontal surface.

In the shown embodiment, the plurality of bristles 3600 is positioned at a depth from the first end 3300, wherein the plurality of bristles 3600 is adapted to scrub the golf club head when reciprocated or otherwise brought to bear thereagainst. In an alternative embodiment, the plurality of bristles 3600 is positioned anywhere along the interior of the brush assembly 3000.

In the shown embodiment, the lid 5000 is configured to seal contents of the housing 2000 therein. The lid 5000 comprises a recessed body 5100 sized to fit within the interior compartment 2100 of the housing 2000 and the tab 5200 extends from a side of the body 5100. The tab 5200 is configured to overhang the sleeve 4000 in the closed configuration. The lid 5000 is sized to engage to the first end and interior of the brush assembly 3000. The body 5100 of the lid 5000 includes a recessed center portion 5300 that extends towards the plurality of bristles 3600 when secured over the brush assembly 3000. The recessed center portion 5300 is configured to frictionally engaged with the brush assembly 3000 to close the first end 3300 of the brush assembly 3000, thereby sealing the contents of the golf club cleaner 1000 therein.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A golf club cleaner for cleaning a head of a golf club, comprising:

a housing comprising: an interior compartment configured to hold fluid therein;

a lip extending around an open upper end; a brush assembly configured to seat over the open end of the housing, the brush assembly comprising:

a sidewall forming an open channel from a first end to an opposing second end; a shoulder disposed at the first end and sized to seat over the lip of the housing;

a plurality of bristles disposed on an interior side of the sidewall and projecting towards the open channel;

a sleeve comprises an annular ring member that is adapted to receive the housing therethrough; an upper end of the sleeve member is configured to engage with the lip of the housing and the shoulder of the brush assembly;

wherein the lip of the housing comprises a female fastener configured to engage with a male fastener of the sleeve to secure the sleeve to the housing;

wherein the sleeve comprises a sleeve ledge having an annular groove, the annular groove configured to engage a tongue disposed on an underside of the shoulder of the brush assembly;

wherein an assembled configuration, the sleeve is configured to cooperatively and removably secure the housing and the brush assembly thereto.

2. The golf club cleaner of claim 1, further comprising a lid configured to seal contents of the housing, the lid comprising: a recessed body sized to fit within the interior compartment; a tab that extends from a side of the body, the tab configured to overhang the sleeve in a closed configuration, wherein the closed configuration the lid is secured to the brush assembly in the assembled configuration.

3. The golf club cleaner of claim 2, wherein a sealed configuration, the lid is secured to the first end of the brush assembly.

4. The golf club cleaner of claim 3, wherein the body of the lid includes a recessed center portion that extends towards the plurality of bristles when secured over the brush assembly, wherein the recessed center portion is configured to frictionally engaged with the brush assembly to close the first end thereof.

5. The golf club cleaner of claim 4, wherein the tab disposed on the side of the body is configured to provide a gripping surface to remove the lid from the brush assembly, the tab extending past a perimeter of the sleeve in the closed configuration.

6. The golf club cleaner of claim 1, wherein the plurality of bristles is positioned at a depth from the first end, wherein the plurality of bristles is adapted to scrub the golf club head when reciprocated thereagainst.

7. The golf club cleaner of claim 1, wherein the sleeve ledge is positioned distal to the female fastener and vertically offset therefrom to form a sleeve trench, wherein the sleeve trench is sized to receive the lip of the housing therein, wherein an upper side of the lip and an upper side of the sleeve ledge are coplanar.

8. The golf club cleaner of claim 7, wherein the housing comprises a housing ledge vertically offset from the lip of the housing, wherein the housing ledge is configured to receive a protrusion of the brush assembly therein, wherein the mating of the housing ledge and protrusion seats the brush assembly to the housing.

9. The golf club cleaner of claim 1, wherein the housing comprises a flat lower end opposing the upper end, wherein the flat lower end is configured to remain upright on a horizontal surface.

10. The golf club cleaner of claim 1, wherein the bristles extend perpendicularly to the sidewall of the housing.

11. The golf club cleaner of claim 1, wherein the bristles extend from opposing sides of the open channel without overlapping with one another.

* * * * *